US009951253B2

(12) United States Patent
Engelhard

(10) Patent No.: US 9,951,253 B2
(45) Date of Patent: Apr. 24, 2018

(54) MULTILAYER FILM WITH HIGH TEAR PROPAGATION RESISTANCE AND LOW SHRINKAGE

(75) Inventor: Heinz Engelhard, Nürnburg (DE)

(73) Assignee: INFIANA GERMANY GMBH & CO., KG, Forchheim (DE)

( * ) Notice: Subject to any disclaimer, the term of this patent is extended or adjusted under 35 U.S.C. 154(b) by 128 days.

(21) Appl. No.: 14/131,967

(22) PCT Filed: Jul. 6, 2012

(86) PCT No.: PCT/EP2012/002857
§ 371 (c)(1),
(2), (4) Date: Feb. 20, 2014

(87) PCT Pub. No.: WO2013/010639
PCT Pub. Date: Jan. 24, 2013

(65) Prior Publication Data
US 2014/0154448 A1   Jun. 5, 2014

(30) Foreign Application Priority Data

Jul. 20, 2011   (DE) .................. 10 2011 107 946

(51) Int. Cl.
| | | |
|---|---|---|
| *B32B 7/06* | (2006.01) | |
| *C09J 7/02* | (2006.01) | |
| *B32B 27/30* | (2006.01) | |
| *B32B 27/32* | (2006.01) | |
| *E04D 5/10* | (2006.01) | |
| *B32B 3/26* | (2006.01) | |
| *B32B 5/18* | (2006.01) | |
| *B32B 7/02* | (2006.01) | |
| *B32B 27/08* | (2006.01) | |
| *B32B 33/00* | (2006.01) | |

(52) U.S. Cl.
CPC .............. *C09J 7/0232* (2013.01); *B32B 3/263* (2013.01); *B32B 5/18* (2013.01); *B32B 7/02* (2013.01); *B32B 7/06* (2013.01); *B32B 27/08* (2013.01); *B32B 27/308* (2013.01); *B32B 27/32* (2013.01); *B32B 33/00* (2013.01); *E04D 5/10* (2013.01); *B32B 2250/03* (2013.01); *B32B 2250/246* (2013.01); *B32B 2250/40* (2013.01); *B32B 2255/10* (2013.01); *B32B 2255/26* (2013.01); *B32B 2307/5825* (2013.01); *B32B 2307/734* (2013.01); *B32B 2307/748* (2013.01); *B32B 2419/06* (2013.01); *Y10T 428/1452* (2015.01); *Y10T 428/2495* (2015.01); *Y10T 428/24355* (2015.01); *Y10T* *428/249982* (2015.04); *Y10T 428/249993* (2015.04); *Y10T 428/31663* (2015.04); *Y10T 428/31913* (2015.04)

(58) Field of Classification Search
CPC ........... B32B 7/06; B32B 27/32; C09J 7/0232
See application file for complete search history.

(56) References Cited

U.S. PATENT DOCUMENTS

| | | | |
|---|---|---|---|
| 6,042,930 A | 3/2000 | Kelch et al. | |
| 2003/0032715 A1* | 2/2003 | Sakaitani et al. | 524/558 |
| 2005/0202197 A1* | 9/2005 | Mohseen et al. | 428/40.1 |
| 2010/0173112 A1* | 7/2010 | Wiercinski | E02D 31/02 |
| | | | 428/41.8 |
| 2012/0009399 A1* | 1/2012 | Nonaka | B32B 7/10 |
| | | | 428/214 |
| 2012/0240511 A1 | 9/2012 | Engelhard | |
| 2012/0258272 A1 | 10/2012 | Engelhard et al. | |

FOREIGN PATENT DOCUMENTS

| | | |
|---|---|---|
| DE | 691 17 873 T2 | 9/1996 |
| DE | 692 327 52 T2 | 5/2003 |
| DE | 600 32 311 T2 | 7/2007 |
| DE | 10 2009 057 862 A1 | 6/2011 |
| EP | 0484093 B1 | 3/1996 |
| EP | 0605643 B1 | 8/2002 |
| EP | 1095765 B1 | 12/2006 |
| JP | 03013338 A | 1/1991 |
| JP | 2000103020 A * | 4/2000 |
| WO | 2011/063914 A1 | 6/2011 |
| WO | 2011/069680 A1 | 6/2011 |

OTHER PUBLICATIONS

Translation of JP 2000-103020. See above for date and inventor.*
German Search Report dated Mar. 8, 2012.
International Search Report dated Nov. 23, 2012, dated Nov. 30, 2012.
English Translation of International Search Report dated Nov. 23, 2012, dated Nov. 30, 2012.

* cited by examiner

*Primary Examiner* — Victor S Chang
(74) *Attorney, Agent, or Firm* — Norris McLaughlin & Marcus P.A.

(57) ABSTRACT

Multilayer film with high tear propagation resistance of at least 300 mN for a total layer thickness of 45 μm, a shrinkage of ≤1% at 120° C. and release properties, comprising a layer (a) formed of at least one propylene copolymer and optionally at least one olefin homopolymer, at least one internal layer (b) formed of at least one olefin/alkyl (meth)acrylate copolymer, a layer (c) formed of at least one propylene copolymer and optionally at least one olefin homopolymer with optional adhesion layers (d) and (e) arranged between layers (a) and (b), and between layers (b) and (c) respectively.

13 Claims, No Drawings

MULTILAYER FILM WITH HIGH TEAR PROPAGATION RESISTANCE AND LOW SHRINKAGE

This is a 371 of PCT/EP2012/002857 filed 6 Jul. 2012 (international filing date), claiming priority of German application 10 2011 107 946.0 filed 20 Jul. 2011.

The present invention relates to a multilayer film with a tear propagation resistance of at least 300 mN measured on a multilayer film having a total thickness 45 µm and with ≤1% shrinkage at 120° C. (in both MD and CD) with release properties comprising a layer (a), preferably as a surface layer, based on at least one propylene copolymer and optionally on at least one olefin homopolymer, at least one internal layer (b) based on at least one olefin/alkyl (meth)acrylate copolymer, a layer (c), preferably as the second surface layer, based on at least one propylene copolymer and optionally on at least one olefin homopolymer and optionally arranged between the layer (a) and the layer (b) respectively between the layer (b) and the layer (c) an adhesion-promoter layer (d) respectively (e), to use thereof as removable protective and/or release film, where at least one of the surface layers of the multilayer film has been provided with release properties, to a waterproof sheeting material comprising said multilayer film, and also to use thereof for the protective covering of roofs.

BACKGROUND OF THE INVENTION

The prior art discloses a wide variety of multilayer films which are suitable for a wide variety of technical applications.

However, a requirement for some of these technical applications is that the multilayer films used therefor feature a combination of very particular mechanical properties. This is particularly true for multilayer films which are used for the production of waterproof sheeting materials, in particular waterproof bitumen sheeting materials.

These waterproof bitumen sheeting materials are used by way of example as protective coverings for roofs.

The prior art has already disclosed waterproof sheeting materials of this type comprising multilayer films with release properties.

These multilayers films known from the prior art and used for the production of waterproof sheeting materials often have the disadvantage of unsuitable mechanical properties such as inadequate tear propagation resistance. In particular multilayer films used as protective release films for waterproof sheeting materials for example for protective coverings for roofs have to comply with stringent mechanical requirements, since these materials have to withstand high mechanical loads not only during storage and handling at the construction site but also in particular after the waterproof sheeting materials have been accurately fitted into place.

This is true in particular because the waterproof sheeting materials provided with the protective release film are initially, without removal of the protective release film, laid out with the greatest possible accuracy of fit on the roof that requires protective covering, and then in each case the protective release film has to be withdrawn underneath the waterproof sheeting material, i.e. between the waterproof sheeting material and the roof that requires protective covering, before the protective covering for the roof is adhesive-bonded to the substrate. In particular for said removal of the protective release film from the adhesive or self-adhesive waterproof sheeting material, the film has to have excellent ultimate tensile strength and high tear propagation resistance, in order to prevent break-off of the protective release film during removal from the waterproof sheeting material.

This type of break-off can sometimes lead to insufficient bonding of the waterproof sheeting material to the substrate, i.e. to leaks in the protective covering for the roof.

Furthermore, the multilayer film used as protective release film, in particular for protective coverings for roofs, has to have very low shrinkage not only in machine direction (MD), but also perpendicularly to the machine direction (CD), since during the production of waterproof sheeting materials for protective coverings for roofs, for example bitumen sheeting materials, hot bitumen is brought into contact with the protective release film. The protective release film is not permitted to shrink as a result of this exposure to heat, since otherwise adhesive or self-adhesive edges of the waterproof sheeting material, the remainder of which has been protectively covered by the protective release film, remain uncovered and can make handling of such waterproof sheeting materials more difficult or even impossible.

There is therefore a requirement for multilayer films, preferably for blown multilayer films, particularly preferably for coextruded blown multilayer films, which not only exhibit very good release properties but also have excellent mechanical properties and exhibit practically no shrinkage on exposure to temperatures of up to 120° C.

SUMMARY OF THE INVENTION

It was therefore an object of the present invention to provide multilayer films which feature excellent mechanical properties, for example high tear propagation resistance, and also practically negligible shrinkage on exposure to temperatures up to 120° C., alongside very good release properties, and which preferably can be produced by the blown-film coextrusion process.

This object is achieved through provision of a multilayer film with a tear propagation resistance of at least 300 mN measured on a multilayer film of total thickness 45 µm and with ≤1% shrinkage at 120° C. (in both MD and CD) with release properties comprising
(a) a layer, preferably as a surface layer, based on at least propylene copolymer and optionally on at least one olefin homopolymer
(b) at least one internal layer based on at least one olefin/alkyl (meth)acrylate copolymer
(c) a layer, preferably as the second surface layer, based on at least one propylene copolymer and optionally on at least one olefin homopolymer and
optionally a layer (d) respectively (e) as adhesion-promoter layer arranged between the layer (a) and the layer (b) respectively between the layer (b) and the layer (c).

DETAILED DESCRIPTION

It is preferable that the multilayer film of the invention is a multilayer blown film, which has preferably been produced by extrusion, in particular by blown-film coextrusion.

It is preferable that the layers (a) and (c) are surface layers of the multilayer film of the invention, where at least one of the surface layers has been provided with release properties.

The layer (a), being identical with or different from the layer (c) of the multilayer film of the invention, is based on at least one propylene copolymer and optionally on at least one olefin homopolymer, e.g. polyethylene or polypropylene, preferably on at least one propylene copolymer.

A preferably suitable propylene copolymer of the layer (a) and, respectively, (c) of the multilayer film of the invention is at least one copolymer of propylene and of an α,β-unsaturated olefin preferably having 2 or from 4 to 8 carbon atoms. It is particularly preferable that the layer (a) and, respectively (c) comprises at least one propylene copolymer from the group consisting of propylene-ethylene copolymers, propylene-butylene copolymers, propylene-isobutylene copolymers and mixtures of at least two of the copolymers mentioned. It is very particularly preferable that the layer (a), and, respectively, (c) is based on at least one propylene-ethylene copolymer preferably having up to 15% by weight, particularly preferably from 1 to 10% by weight, very particularly preferably from 5 to 10% by weight, based in each case on the total weight of the propylene-ethylene copolymer, of ethylene units.

The layer (a) and, respectively, (c) of the multilayer film of the invention can in each case comprise an amount of up to at most 15% by weight, based on the total weight of the layer (a) and, respectively, (c), of at least one propylene homopolymer.

It is preferable that the polymer component of the layer (a) and, respectively, (c) is a propylene copolymer, particularly preferably a propylene/ethylene copolymer.

The expression "based on" means in the invention that the proportion of the polymer components defined therewith "is composed thereof".

The layer (c) is preferably the second surface layer of the multilayer film of the invention.

The thickness of the layer (a) and, respectively, the layer (c), in each case mutually independently from each oter, of the multilayer film of the invention, is preferably from 5 μm to 75 μm, particularly preferably from 10 μm to 50 μm, with particular preference from 15 μm to 25 μm.

In one preferred embodiment of the multilayer film of the invention, the layer (a) and the layer (c) exhibit an identical layer structure, and preferably an identical thickness and/or an identical composition of the polymer components.

The optionally present adhesion-promoter layers (d) and (e), in each case mutually independently from each other, of the multilayer film of the invention are preferably based in each case on at least one modified thermoplastic olefin homo- or copolymer.

Preferable suitable materials for the production of the adhesion-promoter layers (d) and (e) are modified thermoplastic olefin homo- or copolymers of α,β-unsaturated olefins having 2 to 10 carbon atoms, for example polyethylene (PE, in particular LDPE or HDPE), polypropylene (PP), polybutylene (PB), polyisobutylene (PI), or a mixture of at least two of the polymers mentioned. "LDPE" means low-density polyethylene having a density in the range from 0.86 to 0.93 g/cm$^3$ and featuring a high degree of branching of the molecules. "HDPE" means high-density polyethylene which has only a low level of branching of the molecular chain, where the density can be in the range from 0.94 to 0.97 g/cm$^3$. A preferred thermoplastic modified olefin homo- or copolymer for the production of the adhesion-promoter layers (d) and (e) is modified propylene homopolymer. It is preferable that the thermoplastic olefin homo- or copolymers have been modified with polar groups, preferably with organic acid groups (carboxy groups) and/or with organic anhydride groups, particularly preferably maleic anhydride groups.

The thickness of the adhesion-promoter layers (d) and (e), in each case mutually independently from each other, of the multilayer film of the invention, is preferably from 1 μm to 30 μm, particularly preferably from 2 μm to 25 μm, very particularly preferably from 3 μm to 20 μm, in particular from 4 μm to 15 μm.

In one preferred embodiment of the multilayer film of the invention, the adhesion-promoter layers (d) and (e) have an identical layer structure, and preferably an identical layer thickness and/or identical polymer components.

The multilayer film of the invention comprises at least one internal layer (b) based on an olefin/alkyl (meth)acrylate copolymer.

Suitable copolymers of this type of an α,β-unsaturated olefin and of at least one other α,β-unsaturated monomer having at least one ester group, preferably one alkyl (meth)acrylate group, are at least one compound selected from the group consisting of copolymers of $C_1$-$C_6$-alkyl (meth)acrylates, preferably methyl (meth)acrylate, ethyl (meth)acrylate, n- and isopropyl (meth)acrylate, n- and isobutyl (meth)acrylate, tert-butyl (meth)acrylate, 2-ethylhexyl (meth)acrylate, cyclohexyl (meth)acrylate and isobornyl (meth)acrylate, particularly preferably butyl (meth)acrylate and of α,β-unsaturated olefins preferably having from 1 to 8 carbon atoms, particularly preferably ethylene or propylene.

A preferred copolymer present is an ethylene-$C_{1-4}$-alkyl acrylate copolymer, particularly an ethylene-butyl acrylate copolymer.

The thickness of the layer (b) is from 5 μm to 100 μm, preferably from 10 to 50 μm, very particularly preferably from 15 μm to 30 μm.

The layer (a), the layer (b), the layer (c), and also the optionally present adhesion-promoter layers (d) and (e) can if necessary, in each case mutually independently from each other, comprise additives selected from the group consisting of antioxidants, antiblocking agents, antifogging agents, antistatic agents, antimicrobial ingredients, light stabilizers, UV absorbers, UV filters, dyes, color pigments, stabilizers, preferably heat stabilizers, process stabilizers and UV and/or light stabilizers, preferably based on at least one sterically hindered amine (HALS), processing aids, flame retardants, nucleating agents, crystallization agents, preferably crystal-nucleation agents, lubricants, optical brighteners, flexibilizers, sealing agents, plasticizers, silanes, spacers, fillers, peel additives, waxes, wetting agents, surface-active compounds, preferably surfactants, and dispersing agents.

The layer (a), the layer (b), the layer (c), and also the optionally present adhesion-promoter layers (d) and (e), can, in each case mutually independently from each other, comprise at least 0.01 to 30% by weight, preferably at least 0.1 to 20% by weight, based in each case on the total weight of an individual layer, of at least one of the abovementioned additives. To this end, the additives can be incorporated in the form of a masterbatch in polyolefins or in olefin copolymers into the respective layer.

The total layer thickness of the multilayer film of the invention is preferably from 15 μm to 300 μm, particularly preferably from 20 μm to 100 μm, very particularly preferably from 30 μm to 60 μm.

It is preferable that the multilayer film of the invention has a tear propagation resistance of at least 300 mN measured by the Elmendorf method (ISO 6383-2) on the multilayer film of total thickness 45 μm and with ≤1% shrinkage in accordance with DIN 53377 for 1 min of residence time in the oil bath at 120° C., both in the machine direction of the film (MD) and also perpendicularly to the machine direction of the film (CD).

In order to achieve the required release properties of the multilayer film of the invention in relation to adhesive or self-adhesive products, in particular sheet materials for protective covering, in particular suitable for the protective covering of roofs, the multilayer film of the invention is provided with a release coating on at least one of its surface layers, layer (a) or the layer (c). It is preferable that said release layer is based on at least one cured polysiloxane.

For the purposes of the present invention, the term "polysiloxane" means compounds whose polymer chains are composed of alternating silicon and oxygen atoms. A polysiloxane is based on n repeating siloxane units (—[Si($R_2$)—O]—)$_n$ which, in each case mutually independently from each other, have disubstitution by two organic moieties R wherein R is preferably in each case $R^1$ or $OR^1$ and $R^1$ is in each case an alkyl moiety or an aryl moiety. It is preferable that the cured polysiloxane of the invention is based on a repeating dialkylsiloxane unit or on a repeating alkylarylsiloxane unit. In accordance with the number of Si—O bonds in an individual siloxane unit, in each case based on a tetravalent silicon atom, it is possible to divide these units into terminal monofunctional siloxanes (M) having one Si—O bond, difunctional siloxanes (D) having two Si—O bonds, trifunctional siloxanes (T) having three Si—O bonds, and tetrafunctional siloxanes (O) having four Si—O bonds. It is preferable that the polysiloxane used in the invention has a crosslinked ring-type or chain-type structure, particularly a crosslinked chain-type structure, linked via (D), (T), and/or (Q) units to give a two- or three-dimensional network. The number n of repeating siloxane units (—[Si($R_2$)—O]—)$_n$ in the polysiloxane chain is termed the degree of polymerization of the polysiloxane.

The release layer is preferably based on at least one cured, i.e. crosslinked polysiloxane selected from the group consisting of addition-crosslinked, preferably metal-catalyzed-addition-crosslinked, condensation-crosslinked, free-radical-crosslinked, cationically crosslinked, and/or moisture-crosslinked polysiloxanes.

It is preferable that the release layer is based on at least one cured polysiloxane which has been cured via thermal curing, via curing with electromagnetic radiation, preferably via UV radiation, or via exposure to moisture. It is preferable that the release layer of the multilayer film of the invention is based on an at least one cured polysiloxane selected from the group consisting of polydialkylsiloxanes, preferably polydimethylsiloxanes, and polyalkylarylsiloxanes, preferably polymethylphenylsiloxanes, which in each case have been cured.

Thermally cured polysiloxanes are obtained via thermal hydrosilylation of polysiloxanes having silane functions with a compound having at least one carbon double bond. In the case of the polysiloxanes cured via electromagnetic radiation, the crosslinking of the polysiloxanes has been achieved via electromagnetic radiation, preferably via UV radiation. The polysiloxanes crosslinked via exposure to moisture, preferably to water, are obtained via a polycondensation reaction in which at least one silane function and at least alkoxy group or at least one alkoxysilane group form a Si—O bond with elimination of at least one molecule of alcohol. The polysiloxanes to be cured therefore in each case have the functional groups which react with one another and which are required for crosslinking.

It is preferable that the thickness of the release layer of the multilayer film of the invention is from 0.1 μm to ≤3 μm, preferably from 0.2 μm to 1.5 μm.

The multilayer film of the invention has been provided with a release layer on at least one of its surfaces.

In order to improve the release action of multilayer films preferably provided with hardened polysiloxane, in particular in relation to strongly adhesive materials, it is also possible to provide the multilayer film with release layer with an embossed structure. This leads to an uneven surface structure which can improve release effect.

It is moreover also possible to achieve this type of uneven surface structure, aimed to an improved release effect in relation to adhesives and/or adhesive and/or self-adhesive materials having high adhesion even at ambient temperature by providing preferably the surface layer with a release coating, with a closed-cell foam structure. It is preferable that the closed-cell foam structure of said surface layer is based on expanded, hollow microparticles, the expansion of which has been achieved via a volatile organic compound being present in cavity of each microparticle during the production of the layer comprising said particles.

The foam structure in the multilayer film of the invention can therefore be based on expanded hollow microparticles which have preferably been dispersed at least in the layer (a) or (c). The wall (=shell) of the particles is preferably based on a thermoplastic polymer, particularly preferably on a (meth)acrylonitrile homo- or copolymer, whereby the expansion of these particles having been achieved with the aid of at least one volatile organic compound, preferably one volatile hydrocarbon. The boiling point of the volatile organic compound is preferably ≤60° C. at atmospheric pressure, particularly preferably ≤50° C. at atmospheric pressure. The hollow, expanded microparticles are preferably spherical, and preferably have a diameter of from 30 μm to 300 μm, particularly of from 70 μm to 200 μm. Before expansion, the average diameter of the microparticles comprising at least one volatile compound in their cavity is from 15 μm to 30 μm. It is preferable that the melting point of the thermoplastic polymer of the layer (a) or (b) is lower than that of the thermoplastic polymer forming the wall (=shell) of the hollow microparticles.

In order to produce the foam structure in the surface layer of the multilayer film of the invention, it is preferable that from 0.1 to 10% by weight, particularly from 0.2 to 5% by weight, based in each case on the total weight of said layer, of dispersed hollow microparticles, containing the volatile organic compound are present.

The expansion of the microparticles is achieved via evaporation of the volatile organic compound through exposure to heat during the production of the surface layer. It is preferable that the diameter of the expanded microparticles is greater than the total thickness of the multilayer film of the invention.

It is preferable that the density of the surface layer with foam structure is from 0.2 to 1.2 g/cm$^3$, preferably from 0.5 to 1.0 g/cm$^3$.

In one preferred embodiment, the multilayer film of the invention is produced as a tubular film and is further processed after release coating.

In another embodiment, the multilayer film of the invention can be produced to some extent as cast film and optionally processed after release coating.

The production of the individual layers (a)-(c) optionally with (d) and (e) of the multilayer film of the invention is preferably achieved through blown-film coextrusion.

The optionally present foam structure of the layer (a) as surface layer is achieved with the aid of hollow microparticles containing at least one volatile organic compound which have been dispersed in the layer (a) and the shell of which is composed of a thermoplastic polymer. In order to develop the foam structure, the microparticles, not yet expanded, are incorporated into the molten polymer that is to be foamed in the form of a masterbatch and under heat, preferably at a temperature of from 180 to 240° C. The expansion of the microparticles is carried out by the volatilization of the volatile organic compounds present in the particles. In the case of, by way of example, the incorporation is carried out by means of an extruder, the expanded microparticles are present in dispersed form in the polymer material after discharge from the extruder die, and thus provide the closed-cell foam structure.

Again, the resultant multilayer film can be provided with a cured polysiloxane coating.

Because the layer (a) or (c) has a foam structure, firm bonding of the release layer is advantageously achieved on the uneven, rough surface of the layer (a) or (c), structured by virtue of the foam structure. Thus any requirement for an embossment of a smooth surface like of known films can be avoided. The respective production processes and corresponding production parameters are well known to the person skilled in the art.

Each of the layers (a) and (c) of the multilayer film of the invention can be subjected to a surface treatment, e.g. a corona treatment, a plasma treatment, and/or a flame treatment, preferably before application of a release layer, and it is particularly preferable here to carry out a corona treatment.

The multilayer film of the invention can preferably have been printed and/or colored.

The multilayer film of the invention with release properties is preferably used as removable protective film and/or release film, preferably for products which have high adhesion even at ambient temperature.

The present invention therefore also provides the use of the multilayer film of the invention provided with release properties as removable protective or release film, preferably for adhesive or self-adhesive labels, adhesive tapes, stickers, or adhesive or self-adhesive sheeting materials for protective covering, preferably roof-sheeting materials, particularly preferably for self-adhesive bitumen roof-sheeting materials.

The multilayer film of the invention is preferably used as removable protective release film during the production of self-adhesive roof-sheeting materials into a rolled-up form, preferably of self-adhesive bitumen roof-sheeting materials in rolled-up form.

The present invention therefore also provides a preferably self-adhesive, waterproof sheeting material, preferably a roof-sheeting material, provided with a multilayer film of the invention as removable protective release film in rolled-up form.

The present invention further provides a preferably self-adhesive bitumen roof-sheeting material in rolled up form, provided with a multilayer film of the invention as removable protective film and/or release film.

The inventive example and comparative examples below serve to illustrate the invention, but are not to be interpreted as restrictive.

I. Chemical Characterization of the Raw Materials used:

Propylene copolymer: Propylene-ethylene copolymer (ethylene content: from 7 to 9%) from Dow Chemicals Masterbatch 1: Color masterbatch from Schulman comprising about 50% by weight of polyethylene as polymer component Ethylene-butyl acrylate copolymer: Ethylene-butyl acrylate copolymer (butyl acrylate content about 17%) from Lucobit II. Production of the Multilayer Films The multilayer films of comparative examples CE1 and CE2, and also of inventive example IE1 are in each case composed of three layers and of a polysiloxane coating and in each case have a total layer thickness of 45 μm. The thickness of the layers (a) and (c) is in each case 12 μm, the thickness of the layer (b) is 20 μm, and the thickness of the coating is 1 μm. The individual layers of the multilayer films are in each case immediately adjacent to one another in the sequence in which they have been listed in table 1 below. The individual layers (a), (b) and (c) of the multilayer films of the comparative examples CE1 and CE2, and also of the inventive example IE1 were in each case produced by blown-film coextrusion, and in each case provided with a surface layer with a cured polysiloxane coating of thickness 1 μm.

III. Inventive Example and Comparative Examples

All of the % data below are in each case % by weight.

TABLE I

| Layer structure | Raw materials in CE1 | Raw materials in CE2 | Raw materials in IE1 |
|---|---|---|---|
| Layer (a) | Propylene copolymer (90%), Masterbatch 1 (10%) | Ethylene-butyl acrylate copolymer (90%), Masterbatch 1 (10%) | Propylene copolymer (90%), Masterbatch 1 (10%) |
| Layer (b) | Propylene copolymer (100%) | Ethylene-butyl acrylate copolymer (100%) | Ethylene-butyl acrylate copolymer (100%) |
| Layer (c) | Propylene copolymer (90%), Masterbatch 1 (10%) | Ethylene-butyl acrylate copolymer (90%), Masterbatch 1 (10%) | Propylene copolymer (90%), Masterbatch 1 (10%) |
| Coating | cured polysiloxane | cured polysiloxane | cured polysiloxane |

Tear propagation resistance and shrinkage (or dimensional change) were determined on the multilayer film of example IE1 and also of the comparative examples CE1 and CE2, in each case by the method described below, and are set forth in Table 2. The values for tear propagation resistance are stated in machine direction (MD), and the values for dimensional change are stated both in machine direction (MD) and perpendicularly to the machine direction (CD).

TABLE 2

| Inventive example/ comparative example | Tear propagation resistance [mN] | Shrinkage at 120° C. [%] MD | Shrinkage at 120° C. [%] CD |
|---|---|---|---|
| CE1 | about 100 | 0 to −0.5 | 0 to −0.5 |
| CE2 | >800 | not measurable | not measurable |
| IE1 | about 500 | 0 to −0.5 | 0 to −0.5 |

Determination of Tear Propagation Resistance

Tear propagation resistance is determined in accordance with ISO 6383-2 and stated in [mN] as tear propagation force measured on a multilayer film with total thickness of 45 μm.

Determination of Shrinkage (Dimensional Change)

Dimensional change is determined in accordance with DIN 53377 for 1 min of residence time in the oil bath at 120°

C. and is stated as percentage change in machine direction (MD) and also perpendicularly to the machine direction (CD).

What is claimed is:

1. A multilayer protective release film for adhesive waterproof sheeting materials, with a tear propagation resistance of at least 300 mN measured by the Elmendorf method (ISO 6383-2) on a multilayer film of total thickness 45 μm and with ≤1% shrinkage in accordance with DIN 53377 for 1 min of residence time in the oil bath at 120° C. (in both MD and CD) with release properties, comprising
   (a) a layer formed of at least propylene copolymer and optionally at least one olefin homopolymer
   (b) at least one internal layer formed of at least one olefin/alkyl (meth)acrylate copolymer
   (c) a layer formed of at least one propylene copolymer and optionally at least one olefin homopolymer and
   optionally a layer (d) arranged between the layer (a) and the layer (b) and/or a layer (e) arranged between the layer (b) and the layer (c), as an adhesion-promoter layer,
   wherein at least one of the surface layers of the multilayer film has, in order to provide release properties, a cured polysiloxane coating optionally with an embossed surface topography or an unembossed, uneven surface structure due to foaming.

2. The multilayer protective release film for adhesive waterproof sheeting materials as claimed in claim 1, wherein the layer (a) and the layer (c) exhibit an identical layer structure, and optionally an identical layer thickness and/or an identical composition of the polymer components.

3. The multilayer protective release film for adhesive waterproof sheeting materials as claimed in claim 1, wherein the layer (a) and the layer (c), being identical or different from one another, comprise at least one copolymer of propylene and of an α,β-unsaturated olefin.

4. The multilayer protective release film for adhesive waterproof sheeting materials as claimed in claim 1, wherein the layer (a) and/or layer (c) is/are based on at least one propylene-ethylene copolymer having at most 15% by weight, based in each case on the total weight of the propylene/ethylene copolymer, of ethylene units.

5. The multilayer protective release film for adhesive waterproof sheeting materials as claimed in claim 1, wherein the layer (a) and/or layer (c) comprises at most 15% by weight, based on the total weight of the layer (a) or layer (c), respectively, of at least one propylene homopolymer or ethylene homopolymer, whereby the polymer components of the layer (a) and the layer (c) in each case always must be 100% by weight.

6. The multilayer protective release film for adhesive waterproof sheeting materials as claimed in claim 1, wherein the layer (b) is formed of at least one α,β-unsaturated olefin having from 1 to 8 carbon atoms and a $C_1$-$C_6$-alkyl (meth)acrylate.

7. The multilayer protective release film for adhesive waterproof sheeting materials as claimed in claim 1, wherein the layer (d) and/or layer (e) is based in each case on at least one modified, thermoplastic olefin homo- or copolymer.

8. The multilayer protective release film for adhesive waterproof sheeting materials as claimed in claim 1, produced by a blown-film-co-extrusion process.

9. A removable release and/or protective film comprising the multilayer protective release film of claim 1.

10. Adhesive or self-adhesive products comprising the removable release and/or protective film of claim 9.

11. A removable release and/or protective film as claimed in claim 10, wherein that product is a sealing composition, an adhesive tape or a label.

12. A removable release and/or protective film as claimed in claim 11, wherein the sealing composition is an adhesive bitumen composition for a waterproof sealing sheet.

13. A waterproof sealing sheet with a multilayer protective film as claimed in claim 1, as removable release and/or protective film.

* * * * *